United States Patent [19]

Badesha

[11] 4,389,389
[45] Jun. 21, 1983

[54] PROCESS FOR PREPARATION OF HIGH PURITY TELLURIUM

[75] Inventor: Santokh S. Badesha, Ontario, N.Y.

[73] Assignee: Xerox Corporation, Stamford, Conn.

[21] Appl. No.: 404,257

[22] Filed: Aug. 2, 1982

[51] Int. Cl.$^3$ .............................................. C01B 19/02
[52] U.S. Cl. ..................................... 423/510; 549/10; 560/246
[58] Field of Search ...................... 423/508, 509, 510; 549/10, 11, 332, 334, 335, 337, 338, 341, 372, 449, 511; 560/246

[56] References Cited

U.S. PATENT DOCUMENTS

| | | | |
|---|---|---|---|
| 2,481,739 | 9/1949 | Goodman | 175/366 |
| 2,510,361 | 6/1950 | Addink | 175/366 |
| 2,860,954 | 11/1958 | Bueker et al. | 23/209 |
| 2,875,103 | 2/1959 | French | 117/200 |
| 3,723,105 | 3/1973 | Kitajima et al. | 75/134 H |
| 3,954,951 | 5/1976 | Buckley | 423/510 |
| 4,007,255 | 2/1977 | Buckley | 423/510 |
| 4,009,249 | 2/1977 | Buckley | 423/510 |
| 4,015,029 | 3/1977 | Elchisak | 427/76 |
| 4,121,981 | 10/1978 | Ward et al. | 204/38 R |
| 4,175,959 | 11/1979 | Karam et al. | 430/134 |

OTHER PUBLICATIONS

Zingaro, Ralph A. & Cooper, W. Charles *Selenium* Van Nostrand Reinhold Co., 1974, pp. 62–63.
Paul, R. C. et al., "Preparation of Dialkyl Selenites", Indian Journal of Chemistry, vol. 13, #3, Mar. 1975, pp. 292–294.
Bunton, C. A. & Hendy N. B., "Tracer Studies in Ester Hydrolysis Part III", J. of Chem. Soc., 1963, p. 3137.

*Primary Examiner*—O. R. Vertiz
*Assistant Examiner*—Robert L. Stoll
*Attorney, Agent, or Firm*—E. O. Palazzo

[57] ABSTRACT

This invention is generally directed to an improved process for the preparation of tellurium in high purity which comprises reacting tellurium dioxides, with a diol, and subjecting the resulting tellurium ester, subsequent to purification, to a reduction reaction.

20 Claims, No Drawings

PROCESS FOR PREPARATION OF HIGH PURITY TELLURIUM

This invention is generally directed to processes for preparing tellurium of high purity, and more specifically, the present invention is directed to an improved process for the purification of commercially available, or crude tellurium compositions by subjecting the corresponding tellurium esters to a reduction reaction. The tellurium ester can be obtained by treating tellurium oxide with glycols. Tellurium produced in accordance with such a simple process is of high purity (99.999 percent), and is useful as a photoconductive imaging member in xerographic imaging systems.

The incorporation of tellurium or tellurium alloys, especially certain alloys of selenium and tellurium, into xerographic imaging members is well known. These members can be subjected to a uniform electrostatic charge for the purpose of sensitizing the surface of the photoconductive imaging member, followed by exposure of an image to activating electromagnetic radiation such as light, which selectively dissipates the charge in the illuminated areas of the photoconductive member, and wherein a latent electrostatic image is formed in the nonilluminated areas. The resulting image may then be developed and rendered visible by depositing thereon toner particles containing resin particles and pigment particles.

Recently, there has been developed layered organic and inorganic photoresponsive devices containing a photoconductive materials amorphous selenium, trigonal selenium, amorphous selenium alloys, halogen doped tellurium alloys and the like. One such photoresponsive member is comprised of a substrate, a photogenerating layer containing metal free phthalocyanines, metal phthalocyanines, vanadyl phthalocyanine, trigonal selenium, or a selenium-tellurium alloy, and a transport layer containing a diamine dispersed in a resinous binder, reference U.S. Pat. No. 4,265,990. Imaging methods utilizing such layered imaging members are generally charged negatively rather than positively.

Commercially available tellurium and tellurium alloys selected for use as photoconductive members in electrostatic imaging systems are generally of high purity, that is, for example a purity of 99.999 percent or greater. The presence of impurities has a tendency to adversely effect the imaging properties of tellurium, including the electrical properties thereof causing the copy quality obtained with such devices to be relatively poor in comparison to devices wherein high purity tellurium is used.

Present processes for obtaining tellurium, and tellurium alloys in high purity involve a number of process steps, and generally high temperature distillations. Further, in many of these processes the desirable recycling of reactants is not achieved. Also, many of the prior art processes for preparing high purity tellurium and tellurium alloys is complex, economically unattractive and cause environmental contaminations. Additionally, under the same prior art reaction conditions, tellurium compositions of different purity are usually obtained causing an undesirable variance in the electrical properties in these products.

One common commercial method presently employed for preparing high purity tellurium involves distillation of commercial grade tellurium in a hydrogen stream. The distilled tellurium is then dissolved in concentrated hydrochloric acid containing some nitric acid, resulting in the readily crystallizable basic salt, $Te_2O_3(OH)NO_3$. This salt is purified by repeated recrystallization, ignited to the oxide, dissolved in hydrochloric acid, and reduced to form elemental tellurium. The elemental tellurium is further purified by vacuum distillation. This process is repeated until the desired level of purity is attained. Such a process requires multisteps, is complex, and involves a combination of chemical and physical processes. Also, in these processes there is used a high temperature hydrogen stream, and vacuum distillations which are difficult to accomplish, unsafe, and require expensive equipment. Additionally, the prior art processes suffer from the disadvantages that the chemical reagents cannot be recycled, and thus present a major waste disposal problem.

While not directed to the preparation of tellurium or purification thereof, U.S. Pat. Nos. 4,007,255, and 4,009,249, describe processes for preparing photoconductive materials. There is thus disclosed in these patents the preparation of stable, red, amorphous selenium containing thallium and the preparation of red amorphous selenium. In the '255 patent there is disclosed a process for producing amorphous red selenium material containing thallium, which comprises precipitating the selenious acid containing from about 10 parts per million to about 10,000 ppm of thallium dioxide, with hydrazine, from a solution thereof in methanol or ethanol, containing not more than about 50 percent by weight of water, at a temperature between about −20 degrees centigrade, and the freezing point of the solution, and maintaining the resulting precipitate at a temperature of about −13 degrees centigrade to about 3 degrees centigrade until the solution turns to a red color. The '249 patent contains a similar disclosure with the exception that thallium is not contained in the material being treated.

Therefore, there continues to be a need for new, improved processes for preparing tellurium of high purity. Additionally there continues to exist a need for new, improved, simple low temperature chemical processes for obtaining high purity tellurium. There also continues to be a need for improved processes for obtaining high purity tellurium, which involve a minimum number of process steps, do not require high temperature distillation, and wherein most of the reactants can be recycled and reused in the process. Additionally, there continues to be a need for improved process for preparing high purity tellurium wherein environmental hazards are substantially eliminated.

OBJECTS OF THE INVENTION

It is an object of the present invention to provide processes for preparing tellurium of high purity which overcome the above-noted disadvantages.

In another object of the present invention there is provided an improved process for preparing high purity tellurium by subjecting a pure tellurium ester to a reduction reaction.

A further object of the present invention is the provision of an improved process for the preparation of pure tellurium in relatively high yields.

An additional object of the present invention is the provision of a simple, low temperature process for purifying tellurium, wherein most of the reactants can be recycled.

In yet another object of the present invention there is provided processes for obtaining tellurium in high purity, wherein crude tellurium containing impurities is treated with a strong acid, followed by reaction of the resulting oxide with a glycol, and subjecting the resultant separated ester, subsequent to purification, by for example, distillation or crystallization, to a low temperature reduction reaction.

In yet another object of the present invention there is provided an improved process for obtaining high purity tellurium, wherein essentially no pollutants are emitted, and complex distillation apparatus is unnecessary.

It is yet another object of the present invention to provide an improved process for obtaining tellurium in high purity by converting commercial grade tellurium dioxide to a tetraalkoxytellurane ester, which subsequent to separation, and purification is subjected to a reduction reaction.

In another object of the present invention there is provided an improved processes for obtaining tellurium in high purity, wherein commercial grade tellurium tetrachloride is converted to a tetraalkoxytellurane ester, followed by subjecting the substantially pure ester to a reduction reaction.

These and other objects of the present invention are accomplished by the provision of an improved process for the preparation of tellurium of high purity by subjecting pure tetraalkoxytellurane esters to a reduction reaction. More specifically, in one embodiment of the present invention, there is provided an improved process for preparing tellurium of high purity which comprises reacting tellurium dioxide with a glycol, or tellurium tetrachloride with an alkoxide, (sodium ethoxide), and the corresponding alcohol, (ethanol), and subjecting the resultant separated ester, subsequent to purification, by for example, distillation or crystallization, to a reduction reaction.

In another embodiment of the present invention, there is provided an improved process for the preparation of tellurium of high purity by dissolving commercial grade tellurium, or crude tellurium, in a strong acid, such as nitric acid, resulting in the formation of tellurium dioxide which is then reacted with a glycol, resulting in the formation of a tetraalkoxytellurane. This ester, after separation and purification, is then subjected to a reduction reaction as described hereinafter.

In accordance with the improved processes of the present invention, there results a high purity, 99.999 percent or greater, tellurium composition in high yields, these processes being simple in design, and economically attractive since they involve very few process steps. Additionally, in accordance with the processes of the present invention, most of the reactants can be recycled for subsequent use. Furthermore, no environmental pollutants are associated with the improved process of the present invention, primarily since high temperature distillations are not required.

DESCRIPTION OF THE PREFERRED EMBODIMENTS

The process of the present invention will now be described with reference to the following illustrative preferred embodiments, however, process conditions, parameter, and reactants other than those specified can be selected for the process of the present invention providing the objectives thereto are achieved. Accordingly, it is not intended to be limited to the reactants and process conditions that follow.

In one embodiment of the present invention there is provided an improved process for the preparation of tellurium in high purity, 99.999 percent, which comprises dissolving commercial grade tellurium containing contaminants, or crude tellurium, in a strong acid, such as concentrated nitric acid, resulting in a solution of tellurium oxides. The oxides are then reacted with a glycol. The tellurium material to be treated is available from numerous sources, but generally can be obtained from Fisher Scientific Company. Generally, this tellurium material has a purity level of only about 99.5 percent, since it contains a number of contaminants including, arsenic, silver, aluminum, boron, barium, calcium, cadmium, cobalt, chromium, copper, iron, mercury, sodium, magnesium, maganese, molybdenum, nickel, lead, antimony, tin, silicon, titanium, thallium, and zinc. These impurities are removed in accordance with the process of the present invention, resulting in a tellurium material having a purity of 99.999 percent or higher.

As strong acids there can be selected for the process of the present invention commercially available concentrated nitric acid, commercially available concentrated sulfuric acid, and mixtures thereof. When mixtures of acids are utilized, generally from about 20 percent of sulfuric acid and about 80 percent of nitric acid are employed, however percentage mixtures can range from between about 5 percent public acid to about 95 percent nitric acid, and preferably from about 10 percent of sulfuric acid to about 90 percent of nitric acid. The preferred acid is nitric acid, primarily since it is a strong oxidizing acid for the tellurium.

Generally, the strong acid such as nitric acid used for dissolving the crude tellurium product is added thereto in an amount of from about 600 milliliters to about 1,200 milliliters, for each pound of tellurium being dissolved, and preferably from about 800 milliliters to about 900 milliliters.

The resulting suspension of tellurium and acid are stirred at sufficient temperature so as to cause complete dissolution of the crude tellurium. In one specific embodiment, the suspension is subjected to extensive stirring; and the mixture is heated to a temperature not exceeding 110 degrees centigrade, for a sufficient period of time until complete dissolution occurs. Generally, the crude tellurium will be completely dissolved in a period ranging from about 6 hours to about 10 hours. The unreacted nitric acid can then be removed from the reaction mixture, by distillation at the boiling point of the acid, or acid mixture, which generally ranges from about 100 degrees centigrade to about 110 degrees centigrade. The separated acid can then be collected in a receiver and recycled for subsequent use in the reaction.

Subsequently, the tellurium oxide obtained is reacted with a glycol in the presence of a catalyst such as para-toluene sulfonic acid, wherein there results a tetraalkoxytellurane ester. The amount of glycol and catalyst such as para-toluene sulfonic acid selected is dependent on a number of factors including the amount of tellurium oxide formed. Generally, however, from about 1 to about 3 liters of glycol, and from about 5 to about 10 grams of catalyst, such as para-toluene sulfonic acid are used, for each pound of tellurium oxide being treated.

Other catalysts can be selected for assisting in the reaction of the tellurium oxide with the glycol, such catalysts including aliphatic and aromatic sulfonic acids, other than para-toluene sulfonic acid, mineral acids, such as sulfuric acid, acetic acid, hydrochloric acid, and the like. Additionally, other similar equivalent catalysts can be utilized providing the objectives of the present invention are achieved.

Thereafter, the tetralkoxytellurane esters are separated as solids, which can be purified by recrystallization, or as liquids, wherein purification is accomplished by distillation. The isolated pure ester is then subjected to a low temperature reduction reaction as described hereinafter.

As an optional step in the process, any water formed by the reaction of the tellurium oxides with the glycol can be azeotropically removed by distillation employing various aliphatic and aromatic azeotropic agents such as pentane, cyclohexane, toluene and benzene. The temperature of the azeotropic reaction will vary depending on the azeotropic material selected, thus for toluene, the azeotropic distillation is accomplished at a temperature of from 34 degrees centigrade to about 95 degrees centigrade, while for benzene the temperature used is from about 60 degrees centigrade to about 68 degrees centigrade. Generally, complete removal of water occurs in about 8 to about 10 hours, thus allowing substantially complete conversion of the tellurium oxide to the corresponding tellurium ester, tetraalkoxytellurane $Te(OCH_2CH_2O)_2$. It is not necessary to remove water from the reaction mixture since the purity of the resulting tellurium substance will not be adversely affected, however, it is believed that higher yields of tellurium will be obtained with the removal of water, although this may not necessarily be the situation under all reaction conditions.

Numerous known suitable glycols including aliphatic and aromatic diols, can be selected for reaction with the tellurium oxide for the purpose of forming the tellurium ester. Examples of aliphatic diols include those of the following formula:

$$HO(CR_1R_2)_nOH$$

wherein $R_1$, and $R_2$ are independently selected from hydrogen, or alkyl groups containing from 1 carbon atom to about 30 carbon atoms, and preferably from about 1 carbon atom to about 6 carbon atoms, and n is a number of from about 1 to about 10, and preferably from about 1 to about 5.

Illustrative examples of aromatic diols include those of the following formula:

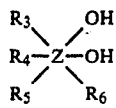

wherein $R_3$, $R_4$, $R_5$, and $R_6$ are independently selected from the group consisting of hydrogen and alkyl groups containing from about 1 to about 30 carbon atoms, and preferably from about 1 to about 6 carbon atoms, and Z is an aromatic ring containing from about 6 carbon atoms to about 24 carbon atoms, such as benzene, and the like.

The alkyl substituents for $R_1$, $R_2$, $R_3$, $R_4$, $R_5$, and $R_6$ include those generally known such as methyl, ethyl, propyl, butyl, pentyl, hexyl, and the like, with methyl, ethyl, and propyl being preferred.

Specific illustrative examples of aliphatic and aromatic glycols that may be selected for the process of the present invention include ethylene glycol, 1,2-propylene glycol, 1,3-propylene glycol, 1,3-pentamethylene glycol, pinacol, 1,2-benzene diols, 1,3-benzene diols, naphthalene diols, and the like, with ethylene glycol being preferred.

The pure tellurium ester is then subjected to a reduction reaction which is an important process step of the present invention, wherein there results subsequent to completion of this reaction, tellurium of high purity, 99.999 percent or greater. Generally the reduction reaction can be accomplished by dissolving the tellurium ester in an organic solvent, such as ethanol, cellosolve, and the like, followed by adding thereto a reducing agent. The reduction of the tellurium ester, subsequent to purification, can be accomplished at various suitable temperatures, dependent, for example, on the reducing agent and solvent selected. Generally, the reduction reaction is accomplished at relatively low temperatures, generally not exceeding 100 degrees centigrade. More specifically, the reduction reaction temperature generally ranges from about 25 degrees centigrade to about 100 degrees centigrade.

Examples of reducing agents that can be selected include those well known in the art such as for example, sulphur dioxide, hydrazine, hydroquinones, thioureas, hydroxylamines, and the like. The preferred reducing agent is hydrazine.

The reducing agent is added to the tellurium ester in sufficient amount so as to result in complete reduction of the ester to pure tellurium. Generally, the amount will vary depending on the reducing agent selected, thus, for example, with hydrazine about 60 millimeters to about 70 millimeters per one pound of ester are used, while sulphur dioxide is bubbled through the ester for a period of from about 1 hour to 2 hours until the reaction is complete. The reaction is generally completed with hydrazine when no nitrogen is being emitted, as evidenced by the absence of bubbles in the ester solution, and the formation of a black precipitate of tellurium.

The resulting high purity tellurium powder can be separated from solution by techniques known in the art such as filtration. Subsequently, the tellurium precipitate is washed numerous times with solvents to remove traces of the unreacted materials. The tellurium product which after drying was analyzed, by for example Emission Spectroscopy, evidenced a purity of 99.999 percent for tellurium.

In another variation of the process of the present invention, the tetraalkoxytelluranes esters can be prepared by the condensation of tellurium tetrachloride, with alcohols in the presence of the corresponding alkoxides, such as sodium methoxide, sodium ethoxide, and the like. The tetraalkoxytelluranes prepared by this method are represented by the following general formula:

$$(RO)_4Te$$

wherein R is an alkyl group as defined hereinbefore.

Illustrative examples of alcohols that can be selected for reaction with the tellurium tetrachloride include those of the formula ROH, wherein R is an alkyl group containing from about 1 to about 30 carbon atoms and preferably from about 1 to about 6 carbon atoms. Specific examples of alcohols that may be selected include ethanol, methanol, propanol, and the like.

The identity and purity of the tellurium ester prepared in accordance with the process of the present invention was determined by infrared, nuclear magnetic resonance, (NMR), ultraviolet (UV), mass spectroscopy, and elemental analysis for carbon, hydrogen, and oxygen; while the purity of the tellurium product obtained was determined by Emission Spectroscopy.

In accordance with the process of the present invention, the tellurium product is also obtained in high yields, that is yields ranging from about 85 percent to 95 percent, and usually from about 90 percent to 95 percent. Accordingly, not only is the tellurium product obtained in exceptional purity, namely 99.999 percent, rendering it highly useful as an electrostatic imaging member in xerographic imaging systems, but such products is obtained in high yields, rendering the process of the present invention economically attractive and very feasible.

The high purity tellurium prepared in accordance with the process of the present invention is suitable for a number of purposes, and can be utilized, for example, as an imaging member in a xerographic imaging system. In these systems, generally tellurium is alloyed with selenium to form a photoconductive imaging member. In one imaging process, a xerographic latent image is formed on the selenium tellurium alloy imaging member, containing the high purity tellurium prepared in accordance with the process of the present invention, followed by developing the image with toner particles comprised of resin particles and pigment particles. Subsequently, the image is transferred to a suitable substrate such as paper and permanently affixed thereto. Consistently high quality images of excellent resolution resulted.

The following examples illustrate preferred embodiments of the present invention, which examples are not intended to limit the scope of the present invention, it being noted that various alternative parameters which are not specifically mentioned are included within the scope of the present invention. Parts and percentages are by weight unless otherwise indicated. The commercial grade tellurium referred to in the Examples was obtained from Fisher Scientific Incorporated, while the tellurium oxide indicated was obtained from Thiokol/Ventron Division, Alfa Products, Danvers, Mass.

EXAMPLE I

A mixture of commercial grade tellurium dioxide (160 grams), p-toluene sulfonic acid (5 grams) and ethylene glycol (1,600 ml) was charged into a 2-liter round bottom (RB) flask equipped with a reflux condenser. The contents of the flask were heated and stirred under an argon atmosphere at 120 degrees centigrade for 3 hours, and then at 160 degrees centigrade until a clear solution was obtained, about 10 to 15 minutes. The above solution was allowed to cool to room temperature and then allowed to stand on a bench for 5 hours. Tetraalkoxytellurane, which separated out as white needles, was collected by filtration, washed with 100 milliliters (2×50 ml) of cellusolve and recrystallized from cellosolve, and identified by infrared, NMR, mass spectral analysis and elemental analysis for carbon, hydrogen, oxygen and tellurium. The overall yield of the ester was 215 grams or 86 percent. The filtrates were discarded. An additional amount of tetraethoxytellurane can be obtained by concentrating the above filtrates.

EXAMPLE II

This example describes the reduction of tetraalkoxytellurane with hydrazine in organic media.

Two hundred grams of the above prepared tellurium ester were dissolved in 1 liter of cellosolve by warming to 60–65 degrees centigrade and then charged into a 2-liter Erlenmeyer flask. A solution of 35 grams of hydrazine in 100 ml of cellosolve was then added dropwise through an addition funnel over a period of 30 minutes. The reaction was exothermic and $N_2$ gas evolved. The resultant black slurry was further stirred for 1 hour and filtered. A black precipitate of crystalline tellurium was collected, washed with 100 milliliters (2×50 ml) cellosolve, dried and weighed. A total yield of 102 grams (84 percent) high purity tellurium, 99.999 percent was obtained. The purity was determined by Emission Spectroscopy which indicated that the resulting tellurium product had the following contaminants: Al, 1 parts per million (ppm); As, 5 ppm; Ca, 1 ppm; Mg, 5 ppm; and Si, 3 ppm.

The above process is repeated with the exception that there was used in place of a solution of 35 grams of hydrazine and 100 millimeters of cellosolve, 35 grams of hydrazine only, and substantially similar results were obtained, that is there resulted a tellurium product of a purity of 99.999 percent.

EXAMPLE III

In this example there is described the preparation of tetraalkoxytellurane esters from commercial grade tellurium by first converting crude tellurium to tellurium dioxide followed by condensing the resulting dioxide, with ethylene glycol.

There was charged into a 1 liter round bottom flask (RB) equiped with a reflux condenser 300 milliliters of concentrated nitric acid followed by adding to the flask 50 grams of commercial grade tellurium. The resulting suspension was stirred and refluxed until the tellurium dissolves, and a white slurry was obtained. This conversion was generally completed in about 6 hours as noted by the formation of a white slurry of tellurium oxide. The unreacted nitric acid was then removed by distillation at a temperature of 110 degrees centigrade to 112 degrees centigrade and any traces of nitric acid were removed under high vacuum. The white residue was identified as tellurium dioxide by spectroscopic analysis and analytical techniques.

The tellurium dioxide was then converted to a tetraalkoxytellurane ester by reacting 80 grams of the oxide with 500 milliliters of ethylene glycol and 5 grams of p-toluene sulfonic acid in accordance with the procedure as described in Example I. The overall yield of tetraalkoxytellurane is 82.5 grams, or 84 percent yield.

A tetraalkoxytellurane of the formula

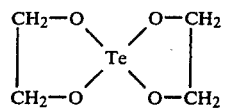

was obtained as confirmed by infrared, nuclear magnetic resonance, (NMR), mass spectral analysis, and elemental analysis for carbon, oxygen, hydrogen, and tellurium.

EXAMPLE IV

In this Example there was reduced the tetraalkoxytellurane ester obtained from commercial grade tellurium, with hydrazine in an organic medium.

In about 100 grams of the pure tetraalkoxytellurane obtained in accordance with the process of Example III was dissolved in 500 milliliters (ml) of cellosolve by stirring at 75 degrees centigrade on a magnetic stirrer. The solution was then charged to 1 liter Erlenmeyer flask. A solution of 15 grams of hydrazine in 50 ml of cellosolve was then added dropwise over a period of 20 minutes. The reaction was exothermic, and N₂ evolved. The resulting black precipitate was collected by filtration, washed with 50 milliliters (2×25 ml) of cellosolve, dried, and weighed. A total of 42 grams (84 percent) of high purity tellurium, 99.999 percent was obtained. The purity was determined by Emission Spectroscopy which indicated that the tellurium had only the following contaminations: Ca, 1 ppm; Cd, 2 ppm; Mg, 2 ppm; Si, 5 ppm.

Tellurium in high purity, 99.999 percent, was obtained from the process described in the above examples, as evidenced by the data contained in the following table, wherein subsequent to spectroscopic and analytical analysis, there was detected impurities as shown in the amounts as indicated. Samples 1 and 2 represent analysis of tellurium obtained from commercial tellurium dioxide, while samples 3 and 4 represents analysis of high purity tellurium obtained from commercial grade tellurium, in accordance with the process of the present invention.

| ELEMENTS | SAMPLE IDENTIFICATION | | | |
| --- | --- | --- | --- | --- |
|  | 1 | 2 | 3 | 4 |
| Ag | — | — | — | — |
| Al | 1*(ppm) | 1 | — | , |
| As | 5 | 5 | — | — |
| B | — | — | — | — |
| Ba | — | — | — | — |
| Bi | — | — | — | — |
| Ca | 1 | 1 | 1 | 1 |
| Cd | — | — | 2 | 2 |
| Co | — | — | — | — |
| Cr | — | — | — | — |
| Cu | — | — | — | — |
| Fe | 1 | 1 | — | — |
| Hg | — | — | — | — |
| Na | — | — | — | — |
| Mg | 5 | 10 | 2 | 2 |
| Mn | — | — | — | — |
| Mo | — | — | — | — |
| Ni | — | — | — | — |
| Pb | — | — | — | — |
| Sb | — | — | — | — |
| Sn | — | — | — | — |
| Si | 3 | 2 | 5 | 5 |
| Te | Balance | Balance | Balance | Balance |
| Ti | — | — | — | — |
| Tl | — | — | — | — |
| Zn | — | — | — | — |
| Se | — | — | — | — |

*The values reported are in parts per million (ppm), with the blanks (—) indicating that there was present an undetected amount of the element involved. The term Balance as used in the Table signifies that the remainder of the sample analyzed contained tellurium. Thus the tellurium is present in an amount that the total of all elements equals 100 percent. Moreover, it is believed that the impurities silicon (Si), magnesium (Mg), and calcium (Ca), result primarily from the glassware selected for use in the process described.

Other modifications of the present invention will occur to those skilled in the art based upon a reading of the disclosure of the present application and these modifications are intended to be included within the scope of the present invention.

I claim:

1. A process for the preparation of tellurium of high purity which comprises reacting tellurium dioxides, with a diol, and subjecting the resulting tellurium ester, subsequent to purification, to a reduction reaction.

2. A process in accordance with claim 1 wherein the tellurium dioxide results from the reaction of crude tellurium with a strong acid.

3. A process in accordance with claim 2 wherein the strong acid is nitric acid.

4. A process in accordance with claim 1, wherein the diol is an aliphatic glycol, or an aromatic glycol.

5. A process in accordance with claim 4 wherein the aliphatic glycol is of the formula

HO(CR₁R)ₙOH wherein R is hydrogen or an alkyl group containing from about 1 to about 30 carbon atoms, and n is a number of from about 1 to about 10.

6. A process in accordance with claim 5 wherein R₁ and R₂ are an alkyl group containing from about 1 to about 6 carbon atoms.

7. A process in accordance with claim 5 wherein the glycol is ethylene glycol.

8. A process in accordance with claim 4 wherein the aromatic diol is of the formula

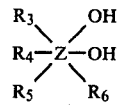

wherein R₃, R₄, R₅, and R₆, are independently selected from hydrogen or an alkyl group containing about 1 carbon atom to about 30 carbon atoms, and Z is an aromatic ring group.

9. A process in accordance with claim 8 wherein Z is benzene, and R₃, R₄, and R₅ are alkyl groups containing from about 1 carbon atom to about 6 carbon atoms.

10. A process in accordance with claim 1 wherein the tellurium ester resulting from the reaction of the tellurium oxides with a diol is of the formula

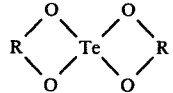

wherein R is an aliphatic group or an aromatic group.

11. A process in accordance with claim 1 wherein the reducing agent is sulphur dioxide or hydrazine.

12. A process in accordance with claim 1 wherein the reduction reaction is accomplished at a temperature of from about 25° C. to about 100° C.

13. A process in accordance with claim 1 wherein tellurium is obtained in a purity of 99.999 percent.

14. A process in accordance with claim 1 wherein the strong acid is separated from the acid tellurium oxide mixture by distillation, and recycled for subsequent use.

15. A process in accordance with claim 1 wherein the diol is separated from the tellurium ester mixture by distillation and recycled for subsequent use.

16. A process for preparing tellurium in high purity which comprises reacting tellurium tetrachloride with an aliphatic alcohol in the presence of an alkoxide, corresponding to the alcohol, and subjecting subsequent to purification the resulting tellurium ester to a reduction reaction.

17. A process in accordance with claim 16 wherein the alcohol selected is of the formula ROH, wherein R is an alkyl group containing from 1 carbon atom to about 30 carbon atoms.

18. A process in accordance with claim 17 wherein the resulting ester is a tetraalkoxytellurane of the formula (RO)₄Te, wherein R is an alkyl group.

19. A process in accordance with claim 18 wherein R is methylene or ethylene.

20. A process in accordance with claim 16 wherein the aliphatic alcohol is ethanol, and the alkoxide is sodium ethoxide.

* * * * *